United States Patent Office 3,424,842
Patented Jan. 28, 1969

3,424,842
MANUFACTURE OF TABLETS DIRECTLY FROM DRY POWDERS
Eberhard Nürnberg, Darmstadt, Germany, assignor to E. Merck A.G., Darmstadt, Germany
No Drawing. Filed May 4, 1965, Ser. No. 453,196
Claims priority, application Germany, May 9, 1964, M 60,952
U.S. Cl. 424—94
Int. Cl. A61k *9/00;* A61j *3/10*
24 Claims

ABSTRACT OF THE DISCLOSURE

Nongranulated, directly dry compressed pharmaceutical tablets of therapeutically active compounds incapable of being dry compressed to acceptable tablets directly without any preparation, the preparation in this case being homogeneously introducing 1–10% by weight of certain powdery, dry adhesives such as cellulose, gelatin, alginic acid and salts thereof, and others.

---

This invention relates to a process for the manufacture of pills, tablets, and the like, and in particular to a process in which pills are produced directly from powders without the aid of an intermediate granulating step.

Normally, the tabletting of powdery pharmaceuticals or mixtures is only possible if the starting material is previously converted, by using a dry or wet process, into flowable granules having a particle size of about 0.05 to 2 mm. and an average particle size of about 0.2 to 0.5 mm. Only few pharmaceuticals possess a sufficient cohesiveness and flowability that they can be compressed to tablets directly without any preparation.

Many attempts have been made to avoid this inconvenient additional granulation step. Thus, it was proposed to moisten the powdery material with aqueous or non-aqueous solvents, said solvents being removed by drying after the tablets are compressed. Moreover, many roughly pulverized substances can be made into tablets without further preparation by adding starch containing 10% cocoa butter. However, upon analysis of these processes, it is seen that the granulation step is merely substituted by another step (moistening or drying, respectively), so that these processes do not solve the problem in an efficient manner.

It was also proposed to make powdery mixtures tablettable by adding certain materials. For this purpose, there were suggested, for instance, whey powder, calcium-silicate aerogel, or microfine-grained silica gel. The amounts to be added of the first-mentioned two compounds are disproportionately large (30 or 20%, respectively, all percentages given now and hereinafter being weight percentages).

The principal object of this invention, therefore, is to provide an improved process for the production of pills, tablets, and the like, said process being characterized by the absence of a granulating step.

Another object is to provide an improved pill which is storable yet rapidly disintegratable in solution.

Upon further study of the specification and claims, other objects and advantages of the present invention will become apparent.

For the purposes of this invention, pills, tablets, and the like are defined merely as "tablets," it being understood that this term embraces all shapes having a predetermined geometry, e.g., the configuration of the die. In general, the particle size of the tablets is in the range of 3 to 30, more commonly 5 to 25 mm.

To attain the objects of this invention, a process is provided which is based on the discovery that powdery mixtures can be easily and efficiently compressed into tablets without a preceding granulation step, if physiologically compatible powdery polyethylene glycols, gelatin, and/or polysaccharides—with the exception of starch—are added to the powdery pharmaceutical composition.

In this application, the expression "polysaccharides" shall also include functionally varied as, for instance, substituted, partially oxidized, or partially reduced derivatives of polysaccharides.

Furthermore, it was discovered that adding these compounds in amounts between 1 and 10%, preferably 2 and 5%, based on the weight of the total powdery composition, is sufficient, thereby avoiding the disadvantage of adding large amounts of the above-mentioned compounds to the tablets. It was indeed surprising that these added compounds—hereinafter called "dry adhesives"—would work in view of the fact that they do not seem to possess any adhesive or gluing effect in the dry state.

The polyethylene glycols that are used are normally solid polymers having, in general, a molecular weight in the range of about 600 to 7000, preferably 3500 to 4500. The gelatin that is used is the usual colloidal protein used for numerous purposes in the pharmaceutical industry. Lastly, suitable polysaccharides are all those found in this large class with the exception of starch, the literature being the source for a large catalogue of these compounds. It is apparent, then, that the submission of the following numerous specific examples is not an attempt to describe the whole class, but is merely for purposes of illustration, for instance, dextrin, inulin, cellulose, cellulose derivatives such as carboxymethyl cellulose, methyl cellulose, ethyl cellulose, hydroxyethyl cellulose, hydroxypropyl cellulose, alginic acids and their salts, hemicelluloses, such as galactomannan, agar-agar, tragacanth, gum arabic, pectins, such as dried apple pectin or sodium amylopectinglycolate.

The molecular weight of these substances can vary considerably. It can be as low as about 1000, f.e., in some dextrins, and as high as about 1,000,000, f.e., in some celluloses. Preferably, however, polysaccharides having molecular weights between about 10,000 and about 300,000 are suitable for the purpose of the invention.

According to the invention, it is, of course, possible to apply plant preparations consisting essentially of polysaccharides which are prepared from plant material being rich in such polysaccharides. Such preparation can, for instance, be obtained from carob, sea-weed, mosses, guar seeds. They may contain small amounts of other substances as long as these are physiologically compatible.

Among all these dry adhesives, the use of a native beech cellulose powder exhibiting the following characteristics has been particularly advantageous:

BEECH CELLULOSE TABLE

| | |
|---|---|
| Average polymerisation degree (determined according to Jayme-Wellm) | 620–680 |
| Specific surface (determined according to Blaine), cm.$^2 \cdot$g.$^{-1}$ | 6000 |
| α-Cellulose content, percent | 89–90 |
| Lignin content, percent | 0.05–0.08 |
| pH in 5% aqueous suspension | 4.9–5.3 |
| Ash content, percent | 0.1–0.2 |
| Resin content (extracted with methanol/benzene 1:1), percent | 0.2–0.4 |
| Piled weight, g.$\cdot$l.$^{-1}$ | 350 |
| Calorific value, kcal.$\cdot$kg.$^{-1}$ | 3800 |
| Average particle size | 10–40µ |

Among these "dry adhesives" are also found such compounds which have already been used for the preparation of granules by the wet method. However, for this purpose, these compounds always had to be dissolved—completely or partially—in a solvent. According to the process of the invention, however, the dry adhesives are added in the form of a powder to the powdery mixture of the active compounds, fillers, disintegrating agents, and polishing compounds; and in this way—after the homogeneous mixing or grinding of all components—a compressible product is obtained. For poorly flowing powdery mixtures it is appropriate to use, during the course of tabletting, suitable stirring, shaking, or vibrating devices, preferably special filling devices, such as the "Rührkammer-Füllschuh" (stirring chamber filling shoe).

For the purposes of this invention, the term "powder" is defined as particulate matter having a particle size less than about 2 mm., particularly less than about 1 mm. The preferred particle size range of the dry adhesive is about 10µ to about 2 mm.

According to the physical properties of the active compounds and/or according to the method of using the tablets (for instance, readily disintegratable tablets such as aspirin, or slowly dissolving tablets such as suckers, etc.), any of the mentioned dry adhesives can be used. It is most advisable to determine by experiment the optimum dry adhesive for every single case. In this way it is possible to obtain tablets whose galenic properties are not inferior to those which are obtained by compression of a granulate. With respect to disintegration, the tablets obtained according to the process of this invention are even superior to the conventional tablets.

The process according to the invention extends to all usual shapes and products manufactured in galenic practice (the art of pharmacy or pill-making), especially to tablets, dragée cores, and rodlets.

All usual tablet machines, preferably rotary tablet machines with force flow-feeding can be used for the process according to the invention. The tablets used in the examples below are made by using a rotary tablet machine with force flow-feeding type P–II–S and P–III as manufactured by the firm of Wilhelm Fette, Schwarzenbek, near Hamburg, Germany.

In general, pressures between 1000 and 10,000 atmospheres are applied to compress the powder into tablets.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

Without a preceding granulation step, tablets of the following composition are compressed under a conventional pressure of about 3000 atmospheres; and the abrasion is determined in a 10 minute test in one or both of the following testing machines of the Engelmann tablet examination system:

(F) "Friabilator".

(A) Abrasion drum (modified in solid clear polymethyl methacrylate).

The basic composition of one tablet of 450 mg. is:

|  | Mg. |
|---|---|
| 2-methyl-3-o-tolyl-4(3H)quinazolinone | 200 |
| Lactose | 180 |
| Corn starch | 45 |
| Talc | 20 |
| Finely divided silica | 2.5 |
| Magnesium stearate | 2.5 |

In tablets possessing the respectively indicated content of dry adhesives, the amount of lactose is reduced correspondingly, so that all tablets possess the same final weight. As a dry adhesive there is used, in each case, a commercial type as indicated in the following table.

| Content, percent | Type of dry adhesive | Abrasion, percent (F) | (A) |
|---|---|---|---|
|  | None | 14 | 4 |
| 5 | Alginic acid preparation (sodium salts) | 6 | 0.5 |
| 5 | Polyethylene glycol (molecular weight, 4,000) | 8.5 | 1.5 |
| 2 | Cellulose powder | 1–4.5 | 0–0.5 |
| 2.5 | Cellulose powder | 1.5 | 0.5 |
| 2.5 | Polyethylene glycol | | |
| 5 | Ethyl cellulose | 8 | 1 |
| 5 | Carboxymethyl cellulose | 7 | 1 |
| 5 | Hydroxyethyl cellulose | 10.5 | 1.5 |
| 5 | Hydroxypropyl cellulose | 9 | 0.5 |
| 5 | Tragacanth | 9.5 | 2 |
| 5 | Gum arabic | 8 | 1.5 |
| 5 | Gelatin | 10 | 1.8 |

Thus, it is seen that, by using the dry adhesives of the invention, tablet abrasion is reduced by 25 to 87%. Consequently, the tablets manufactured without a granulating step but according to this invention, are sufficiently abrasion resistant and solid for pharmaceutical end uses. Furthermore, it is to be noted that mixtures of dry adhesives are embodied in this invention. Thus, the dry adhesive is selected from the group consisting of one or more polyethylene glycols, gelatin, one or more polysaccharides, with the exception of starch, and mixtures thereof.

Example 2

Analogously to Example 1 there are compressed tablets of the following composition and their abrasion is determined. The tablets manufactured according to this invention contain in each case 15 mg. of the dry adhesive specified in the table.

|  | Mg. |
|---|---|
| Dimethylaminophenyl dimethyl pyrazolone | 100 |
| Phenacetin | 100 |
| Caffeine | 20 |
| Salicylic acid amide | 50 |
| Corn starch | 30 |

| Content, percent | Type of dry adhesive | Abrasion (F) |
|---|---|---|
|  | None | 18 |
| 5 | Polyethylene glycol | 9 |
| 5 | Cellulose | 9 |
| 5 | Methyl cellulose | 9 |
| 5 | Ethyl cellulose | 7 |
| 5 | Carboxymethyl cellulose | 7 |
| 5 | Hydroxyethyl cellulose | 11 |
| 5 | Hydroxypropyl cellulose | 12 |
| 5 | Galactomannans | 7 |
| 5 | Alginic acid preparation (sodium salts) | 2 |
| 5 | Agar-agar | 10 |
| 5 | Tragacanth | 10 |
| 5 | Gum arabic | 7 |
| 5 | Gelatin | 8 |

In summarizing the preceding table, it is seen that by using the dry adhesives of this invention, the abrasion of the manufactured tablets is reduced by 33 to 89%.

Example 3

Analogously to Example 1, tablets of the following compositon are compressed and their abrasion is determined. In each case, a part of the lactose is substituted by the indicated amount of the mentioned dry adhesive.

|  | Mg. |
|---|---|
| Meprobamate | 200 |
| Lactose | 60 |
| Corn starch | 30 |
| Talc | 30 |
| Finely divided silica | 3.2 |
| Magnesium stearate | 3.2 |

| Content, percent | Type of dry adhesive | Abrasion (F) |
|---|---|---|
|  | None | 5 |
| 5 | Cellulose | 2 |
| 5 | Methyl cellulose | 2.5 |

In this example, the reduction of abrasion by adding the dry adhesives is 50 to 60%.

In this example, the disintegration times of the tablets are determined in addition. Whereas the standard tablets not containing any dry adhesives disintegrate after an average time of 35 seconds, the tablets made according to the invention containing cellulose or methyl cellulose, respectively, disintegrate after about 20 seconds.

Aside from the foregoing active ingredients, this invention is applicable to the production of tablets from any pharmaceutically active powder. Illustrative is the adaptability of this invention for the manufacture of tablets from the following table:

THERAPEUTICALLY ACTIVE COMPOUND TABLE

Amphetamine
Ascorbic acid (vitamin C)
Barbituric acid and derivatives, such as
    Barbital
    Cyclobarbital
    Phenobarbital sodium
Biotin
Bromelin
Calcium pantothenate
Carbachol
Carisoprodol
Chlormadinone
Chlorothiazide
Cortisone
Cyanocobalamin (vitamin $B_{12}$)
Dexamethasone
Didydrohydroxycodeinone-hydrochloride
Digitoxin
Erogocristine
Erogonovine
Estradiol
Eupaverine
Fencamfamin
Hydrochlorothiazide
Hydrocortisone
7-(2-hydroxypropyl)-theophyllin
Isopropyl antipyrine
Lanatoside C
17α-methyl testosterone
Morphine
Nicotinamide
Pancereatin
Parabromdylamine
Penicillin and derivatives, such as
    Phenoxymethyl penicillin
    Phenoxyethyl penicillin
Piperazine adipate
Prednisolone
Prednisone
Prednylidene
Progesterone
Pyridoxine (vitamin $B_6$) and derivatives, such as
    Pyridoxine hydrochloride
    Pyridoxine phosphate
Pyritinol
Racephedrine hydrochloride
Riboflavin (vitamin $B_2$)
Scopolamine
Sulfanilamide and derivatives such as
    Sulfaperine
    2-sulfanilamido-5-ethyl-pyrimidine
Testosterone
Tetracycline
Thiamine (vitamin $B_1$) and derivatives, such as
    Thiamine mononitrate
    Thiaminium orthophosphoric acid ester phosphate salt
Thyreoidin
Tiomesteron
Trichloromethiazide The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for producing nongranulated directly dry-compressed pharmaceutical tablets, which process comprises:
    (a) homogeneously mixing or grinding into 90–99% by weight of dry powdery therapeutically active compound incapable of being dry-compressed to acceptable tablets directly without any preparation, and an excipient selected from the group consisting of lactose, starch, talc, finely divided silicia, magnesium stearate, and mixtures thereof, 1–10% by weight of at least one physiologically compatible powdery dry adhesive having a particle size of about 10 microns to 2 mm. selected from the group consisting of a normally solid polyethylene glycol, gelatin, dextrin, inulin, cellulose, carboxymethyl cellulose, ethyl cellulose, hydroxyethyl cellulose, hydroxypropyl cellulose, alginic acids and their salts, a hemicellulose, and mixtures thereof; and
    (b) directly compressing the resultant dry homogeneous powdery mixture under sufficient high pressure to form a table of sufficient abrasion-resistance and solidity for pharmaceutical end uses.

2. A process as defined by claim 1 wherein the concentration of dry adhesive is 2 to 5% by weight.

3. A process as defined in claim 1 wherein the dry adhesive is a polyethylene glycol.

4. A process as defined by claim 1 wherein the dry adhesive is gelatin.

5. A process as defined by claim 1 wherein the dry adhesive is cellulose.

6. A pharmaceutical tablet as produced by the process of claim 1.

7. A pharmaceutical tablet as produced by the process of claim 3.

8. A pharmaceutical tablet as produced by the process of claim 4.

9. A process as defined by claim 1 wherein the dry adhesive is a native beech cellulose powder having the properties set forth in the "Beech Cellulose Table."

10. A pharmaceutical tablet as produced by the process of claim 9.

11. A process as defined by claim 1 wherein said compressing step is conducted at 1000–10,000 atmospheres.

12. A pharmaceutical tablet as produced by the process of claim 5.

13. A process as defined by claim 1 wherein said therapeutically active compound consists essentially of at least one compound under said "Therapeutically Active Compound Table."

14. A pharmaceutical tablet as produced by the process of claim 13.

15. A process as defined by claim 1 wherein said excipient consists essentially of starch.

16. A pharmaceutical tablet as produced by the process of claim 15.

17. A process as defined by claim 1 wherein said excipient consists essentially of talc.

18. A pharmaceutical tablet as produced by the process of claim 17.

19. A process as defined by claim 1 wherein said excipient consists essentially of finely divided silica.

20. A pharmaceutical tablet as produced by the process of claim 19.

21. A process as defined by claim 1 wherein said excipient consists essentially of magnesium stearate.

22. A pharmaceutical tablet as produced by the process of claim 21.

23. A process as defined by claim 1 wherein said excipient is selected from the group consisting of starch, talc, finely divided silicia, magnesium stearate and mixtures thereof.

24. A pharmaceutical tablet as produced by the process of claim 23.

References Cited

UNITED STATES PATENTS

| | | | |
|---|---|---|---|
| 1,613,362 | 1/1927 | Sheppard et al. | 264—123 XR |
| 1,770,573 | 7/1930 | Haavardsholm | 264—109 |
| 2,951,791 | 9/1960 | Stearns | 167—82 |
| 3,015,611 | 1/1962 | Smedresman | 167—82 |
| 3,065,143 | 11/1962 | Christenson et al. | 167—82 |
| 3,096,248 | 7/1963 | Rudski | 167—82 |
| 3,101,299 | 8/1963 | Ferrand | 167—82 |
| 3,116,204 | 12/1963 | Siegel et al. | 167—82 XR |
| 3,266,992 | 8/1966 | De Jong | 167—82 |
| 3,312,594 | 4/1967 | Cyr et al. | 167—82 |
| 3,344,030 | 9/1967 | Stevens et al. | 167—82 |

LEWIS GOTTS, *Primary Examiner.*

SHEP K. ROSE, *Assistant Examiner.*